3,117,749
GROUND CONTROL FOR HELICOPTERS
Henry R. Angel, Trumbull, Conn., assignor to United Aircraft Corporation, East Hartford, Conn., a corporation of Delaware
Filed June 26, 1959, Ser. No. 823,076
15 Claims. (Cl. 244—17.17)

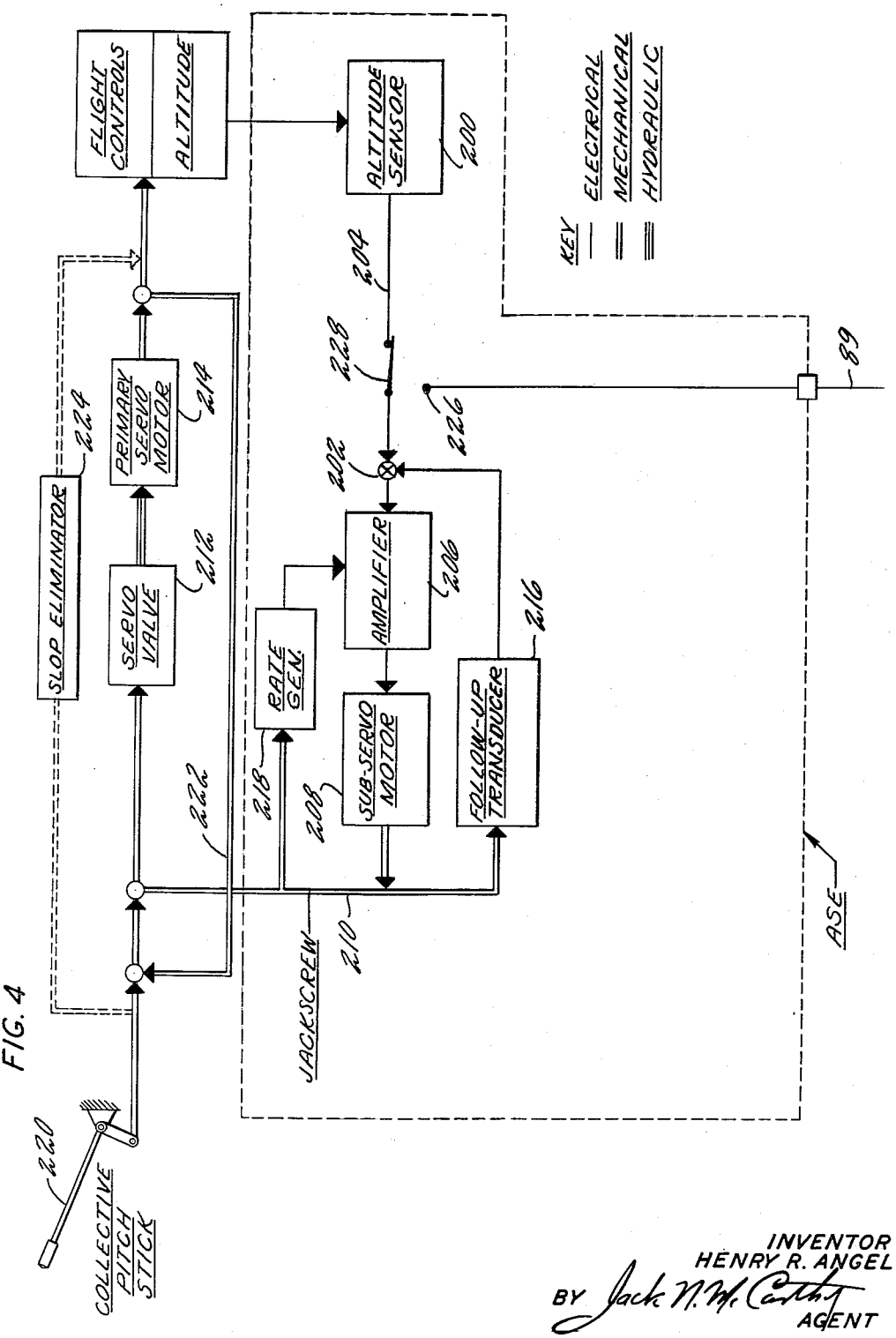

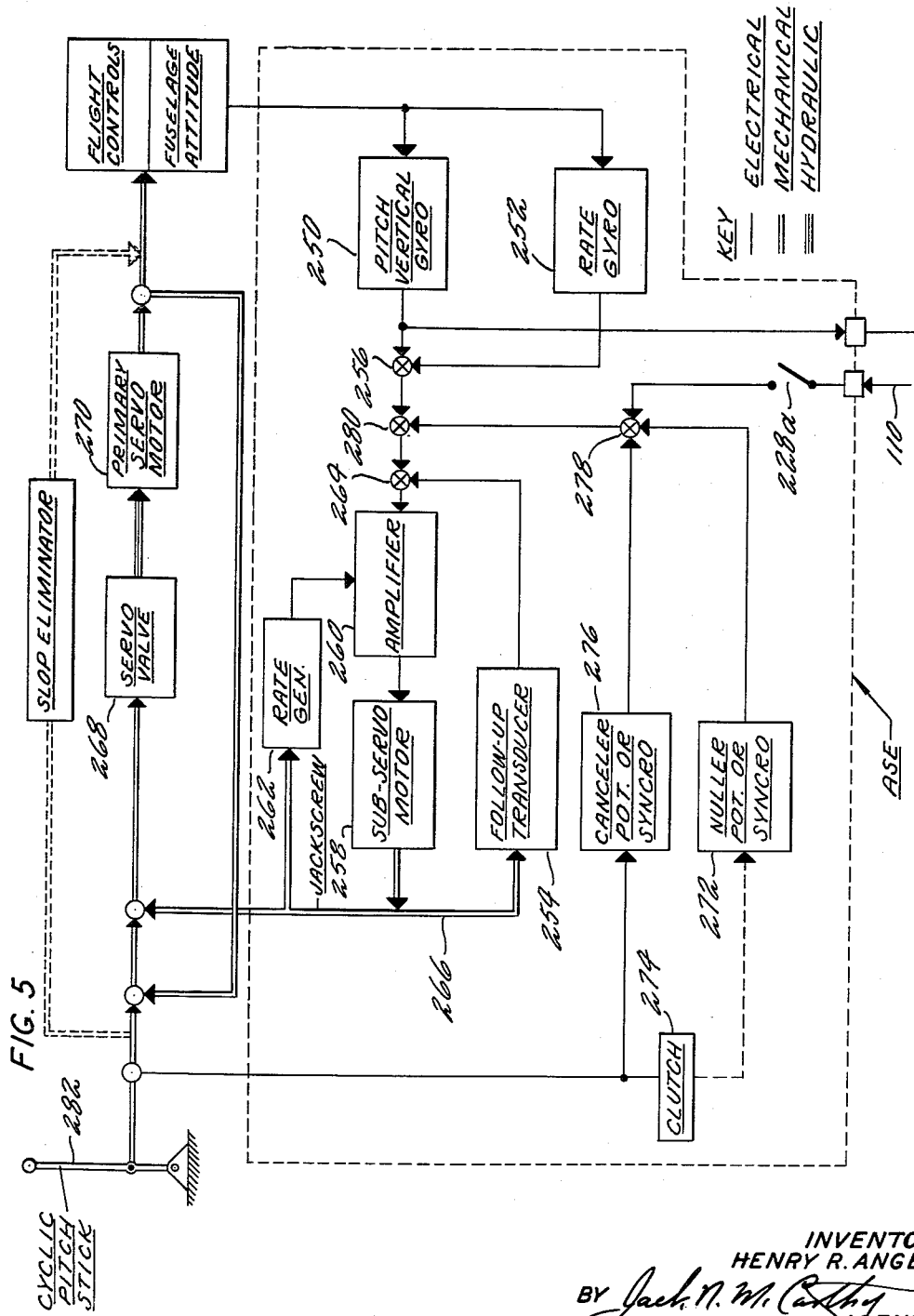

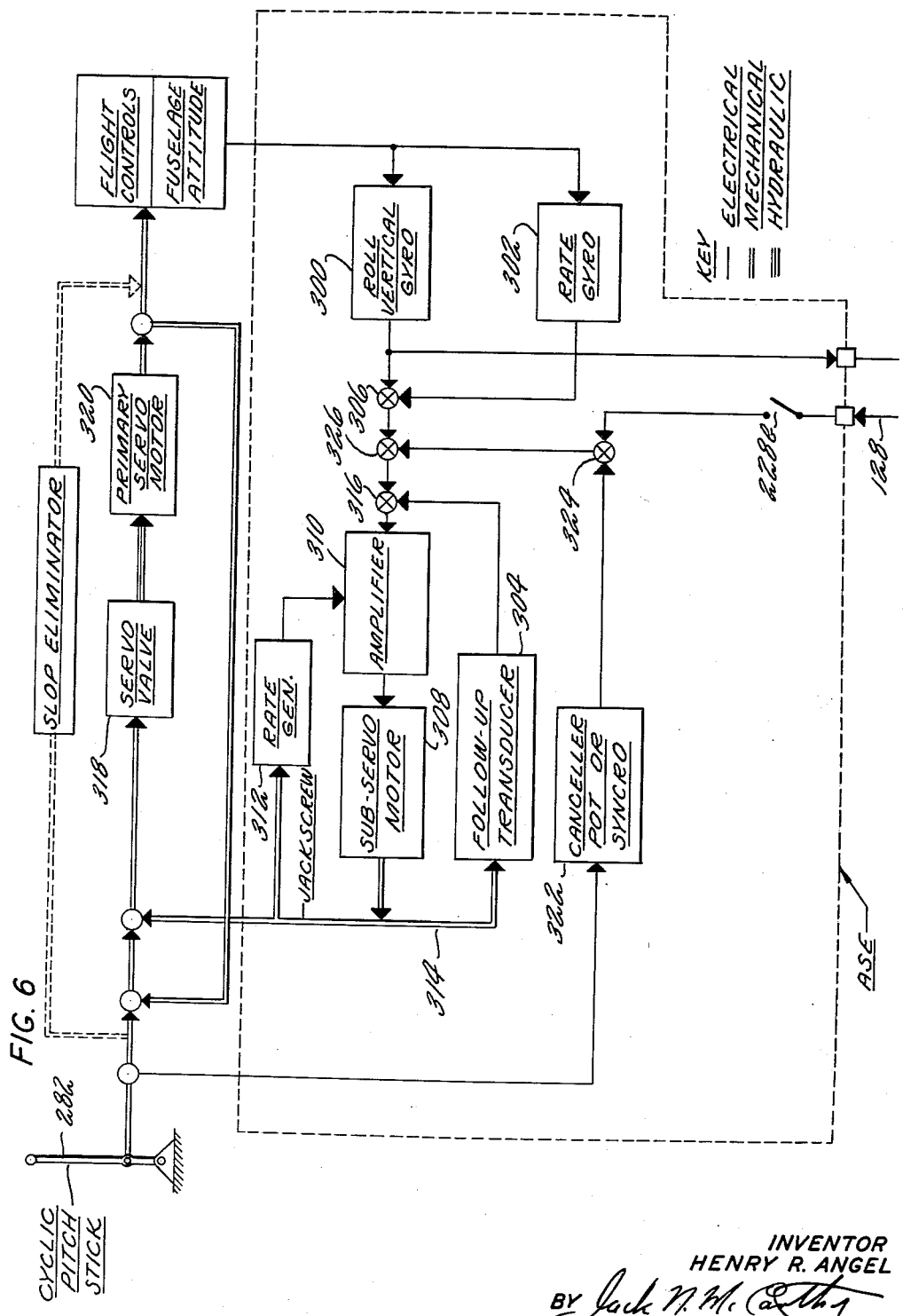

This invention relates to a ground control for helicopters.

An object of this invention is to provide means connected to a helicopter that will enable a man on the ground to take over control of a helicopter from the pilot.

Another object of this invention is to provide means for operating a helicopter from the ground where the pilot's ground visbility is impaired.

A further object of this invention is to provide means which will aid in landing in restricted, or congested places, such as on platforms on ships at sea.

Another object of this invention is to provide means for permitting operation by a man on the ground yet permit the pilot to override the ground control and regain command of the helicopter, if necessary.

A further object of this invention is to provide means for the pilot and ground operator to communicate with each other.

Another object of this invention is to provide means for permitting precise hovering by a ground operator.

A further object of this invention is to provide means for converting mechanical movements of a ground operator into electrical signals which may be used to control a helicopter.

Another object of this invention is to provide coupling means which will enable signals generated by mechanical movements of a ground operator to be altered so that they can be used with existing automatic stabilization equipment.

A further object of this invention is to provide means for varying the force required to maintain a helicopter at a constant altitude by a ground operator.

Another object of this invention is to provide means for permitting a ground operator to have his controlling line at varying angles from a reference line yet have no output from this angular deviation.

These and other objects and advantages of the invention will be evident or may be pointed out in connection with the following detailed description of the drawings in which one embodiment of the invention is illustrated.

In the drawings:

FIG. 4 is a block diagram showing the relationship of the components of the altitude channel of one form of automatic stabilization equipment with manually operable helicopter controls;

FIG. 5 is a block diagram showing the relationship of the components of the pitch channel of one form of automatic stabilization equipment with manually operable helicopter controls; and FIG. 6 is a block diagram showing the relationship of the components of the roll channel of one form of automatic stabilization equipment with manually operable helicopter controls.

Figure 1:
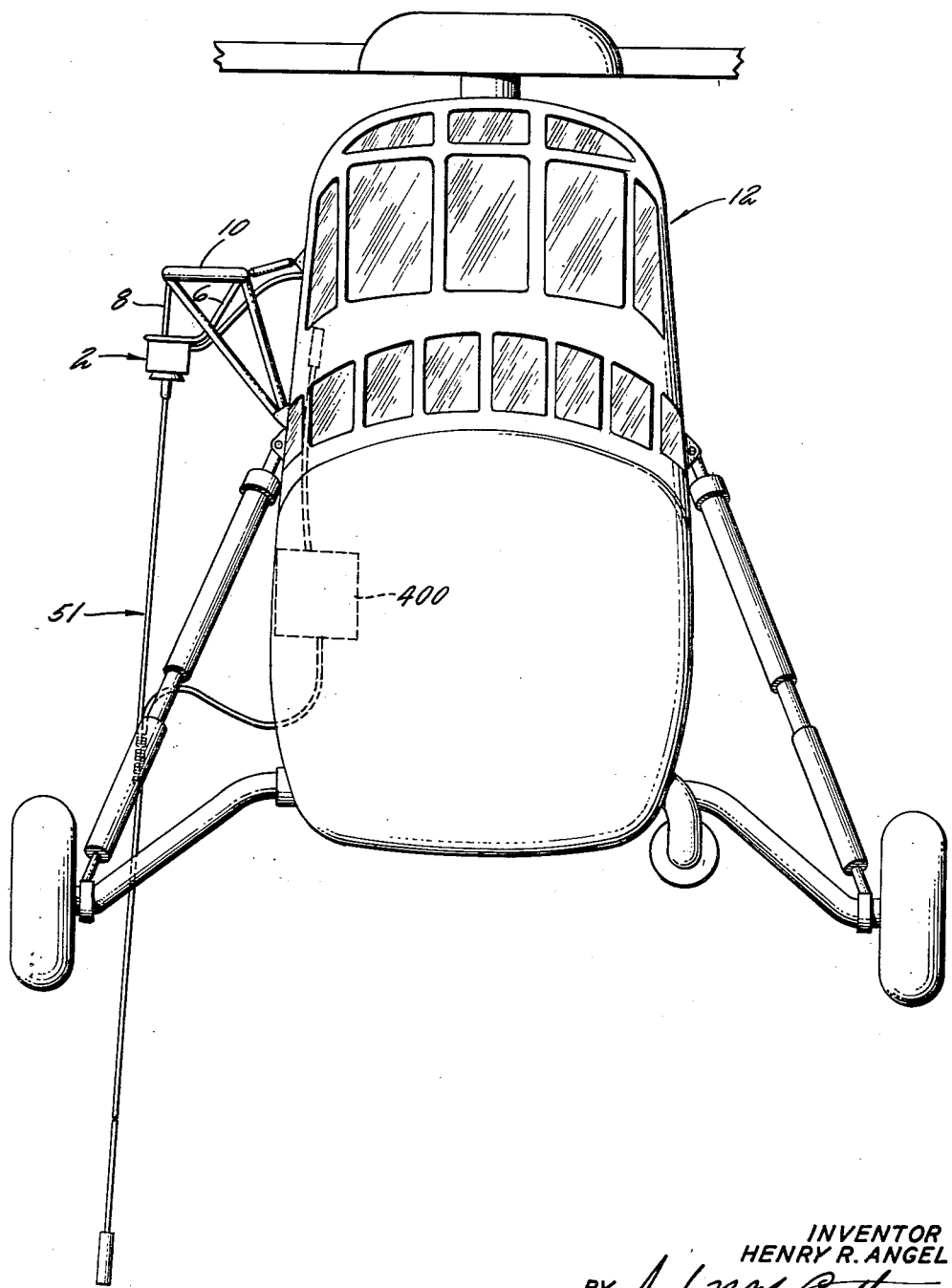
FIG. 1 is a front view of a helicopter showing the location of the control sensor unit.

The manual control sensor unit 2 comprises a casing 4 attached by arms 6 and 8 to arm means 10 which projects away from the side of a helicopter 12. The helicopter and automatic stabilization equipment is of the type disclosed in U.S. Application Serial No. 741,531, filed June 12, 1958, now U.S. Patent No. 3,037,722. In the figures the abbreviation ASE has been used to indicate automatic stabilization equipment.

The control unit 2 comprises two main parts. The first part comprises the means manually moved by a ground operator; and the second part comprises the means for transferring the movements of the ground operator into electrical signals which can be made to operate the blades of the helicopter to obtain a desired helicopter movement.

The casing 4 is formed as a box with the bottom having a large circular opening 14 with a frusto-conical member 16 fixed to the inner periphery of the opening. Fixed to the center of the top of the box-like casing by a short shaft 18, is the top of a universal coupling 20. The axis A—A of shaft 18 passes through the center of the universal coupling 20. The bottom of the universal coupling is attached to the top of a cage 22. A transducer assembly 24 is mounted on the base of the cage 22 for a purpose to be hereinafter described.

Mounted on the inside of casing 4 on one side is a transducer assembly 26 which can be rotated by an arm assembly 28. The transducer assembly 26 has a base 30 which is bolted to one side of the casing 4 by bolts 32. The body 34 of the transducer assembly 26 is fixed to the base 30 about an axis B—B which intersects the central axis A—A of the shaft 18 and is normal to it. Axis B—B also passes through the center of the universal joint 20. Arm assembly 28 is attached to a moveable rotor in the body 34 of the transducer assembly 26 to rotate it. The arm assembly 28 comprises an arm 36 which extends downwardly from the point where it is connected to the transducer body 34. At a point near the bottom of the casing, the arm 36 extends inwardly having a radius of curvature which has its center at the center of the universal joint 20. Also mounted on the inside of casing 4, on a side adjacent the side on which transducer assembly 26 is mounted, is another transducer assembly 38 which can be rotated by an arm assembly 40. The transducer assembly 38 is identical to transducer assembly 26 and is mounted in the same manner. The body 42 of the transducer assembly 38 is fixed to its base about an axis C which intersects the central axis A—A of the shaft 18 and is normal to it. Axis C also passes through the center of the universal joint 20. The axis C of the transducer assembly 38 is positioned 90° from the axis B—B of the transducer assembly 26. Transducer assemblies 26 and 38 can be control transformers.

Arm assembly 40 is attached to a moveable rotor in the body 42 of the transducer assembly 38 to rotate it. Arm assembly 40 comprises an arm 44 which extends downwardly from the point where it is connected to the transducer body 42. At a point near the body of the casing, the arm 44 extends inwardly having a radius of curvature which has its center at the center of the universal joint 20. The curved portion of arm 44 extends under the curved portion of arm 36.

A tubular member 46 is fixed to the bottom of said cage 22 by bolts 48 and extends to a point substantially below the lower end of the frusto-conical member 16. The apex of the imaginary cone from which the frusto-conical member 16 is taken, falls on axis A—A at a point just above the center of the universal coupling joint 20 so that member 16 forms an annular limit stop for tubular member 46.

Tubular member 46 is formed with an upper part 50 having a large diameter and a lower part 52 having a small diameter. Upper part 50 extends down from the cage 22 to a point just above the point where arm assemblies 28 and 40 intersect. The lower part 52 extends downwardly therefrom through a protective collapsible boot 54. Boot 54 is connected between the lower end of the frusto-conical member 16 and the lower part 52 of the tubular member 46.

Arm 44 of the arm assembly 40 curves to the side at 56 which is at a location above the point where the arm 44 extends inwardly having its predetermined radius of curvature. This arm curves to the side an amount which places the inwardly extending portion of the arm 40 adjacent one side of the lower part 52 of tubular member 46. The arm assembly 40 is formed with forked ends by the use of an arm section 58 which is shaped having its lower portion like that of the arm 44 but with a straight downwardly extending portion 60. Arm section 58 is pivoted to the arm 44 just below where it is attached to the transducer assembly 38 by a lever 62. Arm section 58 has its inwardly extending portion located on the opposite side of tubular member 46 from the inwardly extending portion of arm 44. A tension spring 64 is attached between the arms 44 and 58 just below where the arm 44 bends to the side to keep the arms against the opposite sides of tubular member 46. This eliminates "slop" between the arm assembly 40 and tubular member 46.

Arm 36 of the arm assembly 28 curves in the same manner as arm 44 of the arm assembly 40. The arm assembly 28 is also formed with forked ends by the use of an arm section 37 similar to the arm section 58 used on arm assembly 40. The arm section of arm assembly 28 is located on the opposite side of tubular member 46 from the inwardly extending portion of arm 36. A tension spring 65 positions these arms against the opposite sides of tubular member 46. This eliminates "slop" between the arm assembly 28 and tubular member 46. It can be seen that the lower portion 52 of tubular member 46 extends through the opening formed by the crossing forked members.

As the tubular member is moved about the center of the universal coupling 20, any movement in a direction about axis B—B will rotate arm assembly 28 and therefore the transducer rotor of assembly 26, and any movement in a direction about axis C will rotate arm assembly 40 and therefore the transducer rotor of assembly 38. Transducers 26 and 38 are of a type well-known in the art and each puts out an electrical signal which is proportional to the rotative movement of its input member.

The upper part 50 of the tubular member 46 has a chamber 66 therein and is connected to the passage formed through the lower part 52 of the tubular member 46. A rod member 68 is positioned in tubular member 46 with one end extending from the lower part 52. The upper end of the rod member 68 is attached to a piston 70 which is located within chamber 66. Piston 70 has a skirt 72 which extends to a point near the bottom of chamber 66 allowing rod member 68 a small amount of axial movement. A spring 74 is located around the rod member 68 within the space formed between skirt 72 and rod member 68, and has one end seated against the underportion of the top of piston 70 and the other end seated against the bottom of chamber 66. The action of this spring biases the rod 68 upwardly so that the top of the piston 70 is held against an upper stop.

The operator's control line 51 for the manually controlled sensor unit 2 comprises a short shock-type cord 53 having a fastener 55 which is adapted to be fixed to the free end of rod member 68 which projects below the tubular member 46 and boot 54. Fastener 55 is shown as a member having a recess to receive the lower end of rod 68 and a bolt which can be positioned through openings in the lower end of rod 68 and in the fastener 55. The lower free end of cord 53 is fixedly attached to another line section 57 which extends downwardly to a ground operator and which also extends away therefrom into the helicopter through an intercom unit 400 to a position adjacent the pilot. Line section 57 is formed as an electrical conductor means having wires extending therethrough with each end of the line section 57 having a head set jack attachment so that the ground operator and the pilot can communicate during operation of the craft between the two.

The ground operator controls the position of rod member 68 and tubular member 46 to position the craft by the sensor unit 2 and a coupler along with automatic stabilization equipment.

Transducer assembly 24 is of a type well-known in the art and puts out an electrical signal in proportion to the axial movement of its mechanically movable input member. This input member is attached to the top of rod member 68 at 76. Transducer assembly 24 has its mechanically movable input member biased to its uppermost position through rod member 68 by action of spring 74. The transducer assembly in this position has its maximum signal output.

Figure 3:
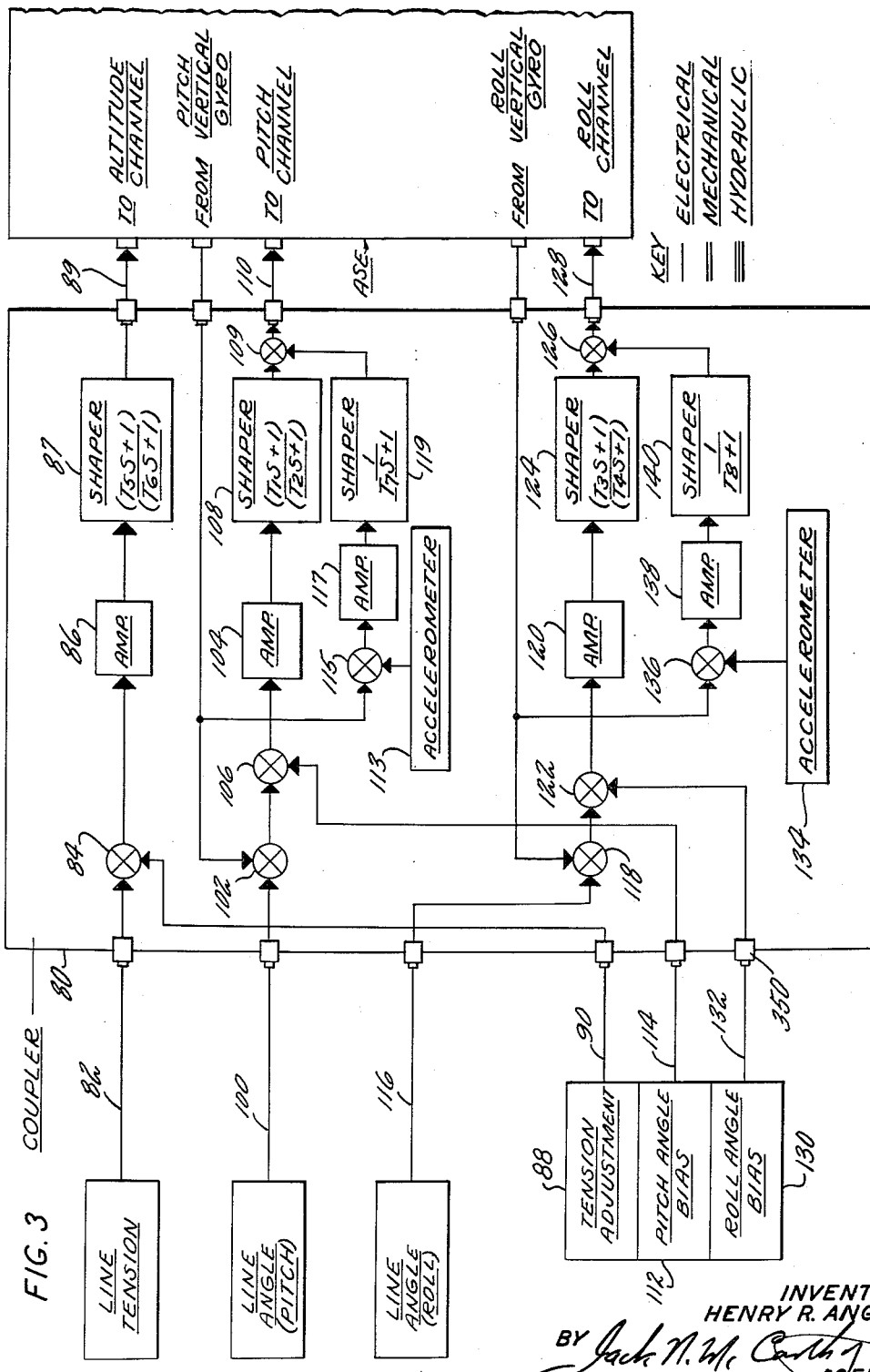
FIG. 3 is a block diagram showing the relationship of components of a ground control and a coupler for use with automatic stabilization equipment.

Any signal from transducer assembly 24 passes through electrical conductor means 82 to coupler 80 (see FIG. 3). Conductor means 82 is connected to a mixing point, or network, 84 within said coupler. Mixing point 84 is in turn connected by an amplifier 86 to a shaping device 87. Shaping device 87 is connected by electrical conductor means 89 to the altitude channel of the automatic stabilization equipment which is separate from said coupler. Shaping device 87 is an electrical network having a transfer function of $$\frac{(\tau_5 S+1)}{(\tau_6 S+1)}$$

where the time constant $\tau_6$ is less than the time constant $\tau_5$, and S is the familiar LaPlace operator. This device is provided for system stability and ease of operation. A tension adjustment device 88 has its output connected to the mixing point 84 by electrical conductor means 90. This tension adjustment device puts out a constant signal which algebraically subtracts from the output of transducer assembly 24 at mixing point 84 and which can be manually set between limits.

Transducer assembly 24 produces a signal which, if passed through mixing point 84, amplifier 86, and shaping device 87 to the altitude channel of the automatic stabilization equipment, will cause the helicopter to rise. Tension adjustment device 88 produces a signal which, if passed through mixing point 84, amplifier 86 and shaping device 87 to the altitude channel of the automatic stabilization equipment, will cause the helicopter to descend. These actions are caused by the working of the automatic stabilization equipment.

As the mechanically movable input member 68 is moved downwardly, the output signal from transducer assembly 24 is decreased proportionately. Tension adjustment device 88 provides the signal which the transducer has to exactly cancel to have a zero output signal from mixing point 84. If this device is set at a high value, it is only necessary to move rod member 68 down a short distance to cancel the signal with rod member 68 only compressing spring 74 a small amount. While the rod member is held in this position against the compression of spring 74, the helicopter holds its altitude. If the rod member 68 is moved lower, the magnitude of the signal put out by transducer assembly 24 becomes less than that of the tension adjustment device, and the helicopter descends. Conversely, if the rod member 68 is raised, the magnitude of the signal put out by transducer assembly 24 becomes greater than that of the tension adjustment device, and the helicopter rises.

If it is desirable to increase the force required to hold rod member 68 in a "null" position, position of no signal output from mixing point 84, the tension adjustment device is set to put out a smaller signal. In this event, the rod member 68 and movable member of transducer assembly 24 has to be moved to a lower position with respect to the body of transducer assembly 24, thereby compressing spring 74 to a greater degree. To reduce the force required to hold rod member 68 in a "null" position, the tension adjustment device is set to put out a larger signal.

Figure 2:
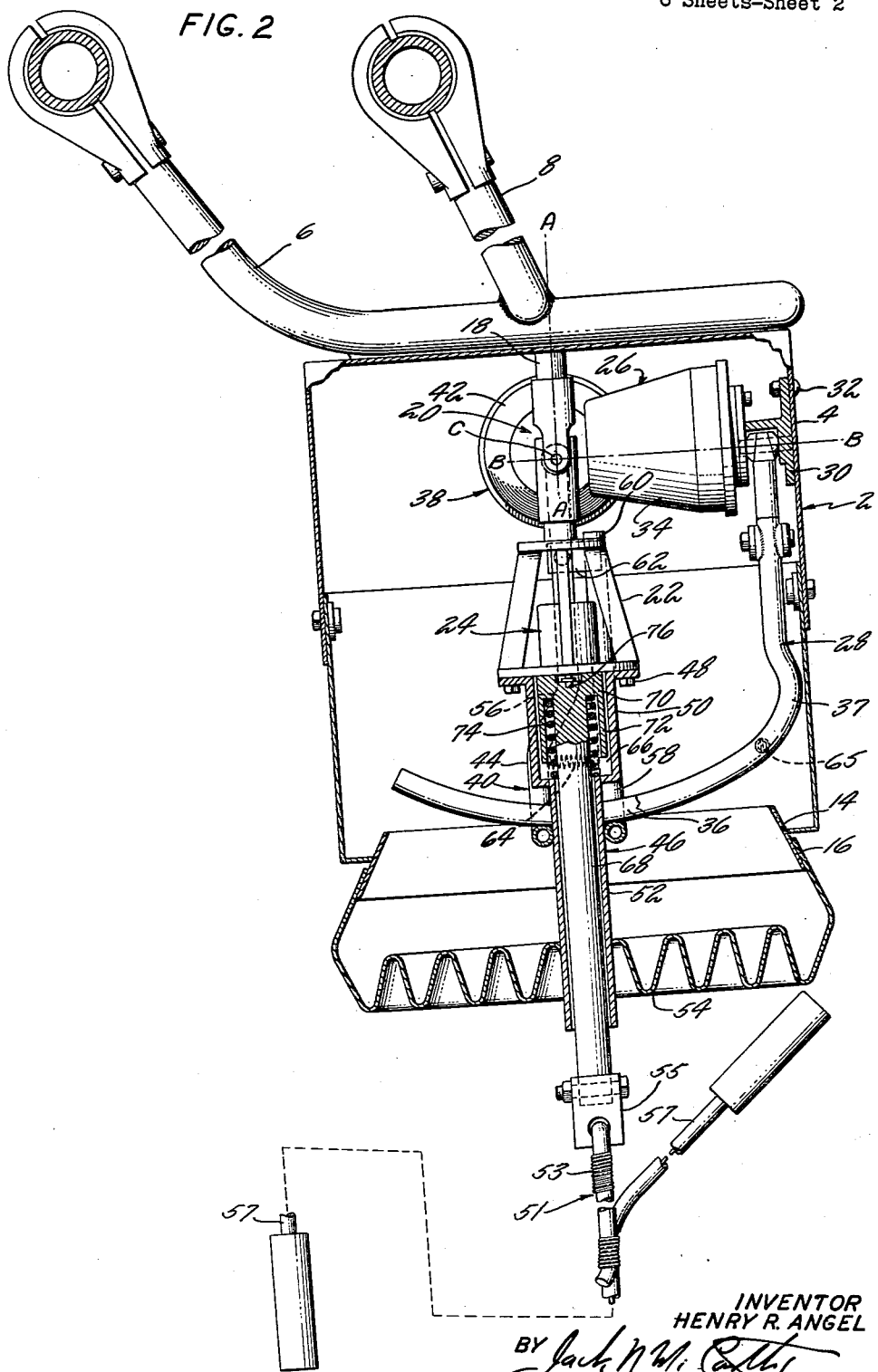
FIG. 2 is an enlarged view of the control unit which transfers the movement of the ground operator into a signal which can then be made to control the position of the helicopter blades.

Transducer assembly 26 has its body and rotor so positioned that when tubular member 46 has its axis coinciding with axis A—A, there is no signal output. When the arm assembly 28 is moved forwardly from its "null" position by the action of tubular member 46, an output signal is generated which will make the helicopter move forwardly and when the arm assembly 28 is moved rearwardly from its "null" position, an output signal is generated which will make the helicopter move rearwardly (in FIG. 2 forward movement of arm assembly 28 is away from the viewer and rearward movement of arm assembly 28 is toward the viewer).

Any output signal from transducer assembly 26 passes through electrical conductor means 100 to coupler 80. Conductor means 100 is connected to a mixing point 102. Mixing point 102 is in turn connected to an amplifier 104 by another mixing point 106. Amplifier 104 has its output connected to a shaping device 108. Shaping device 108 is connected to another mixing point 109 and the output of this mixing point 109 is connected by electrical conductor means 110 to the pitch channel of the automatic stabilization equipment. The shaping device 108 has a transfer function of $$\frac{(\tau_1 S+1)}{(\tau_2 S+1)}$$

where the time constant $\tau_2$ is less than the time constant $\tau_1$, and S is the familiar La Place operator. This is provided for system stability and ease of operation.

The signal from transducer assembly 26 is indicative of the line angle in a longitudinal direction relative to a reference line extending through axis A—A. Changes in line angle to said reference line are caused by changes in fuselage attitude and relative translation from the position of the ground operator in this direction. Changes of the helicopter attitude alone caused by an outside force produce an unwanted signal into mixing point 106. To cancel this unwanted signal, the output from the pitch vertical gyro is connected to mixing point 102 which is located between assembly 26 and mixing point 106. This output signal from the pitch vertical gyro is an indication of the fuselage attitude relative to a vertical reference line. The signal passing from mixing point 102 to mixing point 106 is an indication of the line angle in a longitudinal direction relative to a vertical reference line. Changes in relative translation of the helicopter from the position of the ground operator in a longitudinal direction are command movements and produce a movement of the input member of transducer assembly 26 which will send an error signal to the mixing point 106. Any such signal from mixing point 102, if passed through mixing point 106, amplifier 104 and shaping device 108 to the pitch channel of the automatic stabilization equipment, will cause forward or backward movement of the helicopter.

A pitch angle bias device has its output connected to the mixing point 106 by electrical conductor means 114. This pitch angle bias device puts out a constant signal which combines with the signal from mixing point 102. This pitch angle bias device 112 provides a signal which the transducer 26 has to cancel to have a zero output signal from mixing point 106. If this bias device 112 is set at zero output, transducer assembly 26 is positioned in its regular "null" position which provides no signal output and therefore there is no corresponding movement of the helicopter. However, if the pitch angle bias device is set to produce an output signal, this signal will pass through mixing point 106 to the pitch channel of the automatic stabilization equipment until it is cancelled by a movement of transducer assembly 26. When transducer assembly 26 has cancelled this output signal of pitch angle bias device 112, its new "null" position will be at an angle to the "null" position it had with a zero output from the pitch angle bias device 112. As the output of the pitch angle bias device 112 is varied, this will in turn vary the angle in a longitudinal direction at which it will be necessary to position tubular member 46 to obtain no error signal output from mixing point 106.

Coupler 80 includes an accelerometer 113 which generates a signal which is indicative of the horizontal acceleration in a longitudinal direction of the helicopter plus its attitude relative to a vertical reference line. The output of accelerometer 113 is connected to a mixing point 115. The output signal from the pitch vertical gyro is connected to mixing point 115 to feed in a signal which is an indication of the fuselage attitude relative to a vertical reference line. These signals are electrically combined in mixing point, or network 115 so that the output of mixing point 115 is proportional only to a horizontal acceleration in a longitudinal direction. Mixing point 115 is connected to an amplifier 117 which is in turn connected to a shaper 119. The output of shaper 119 is connected to mixing point 109. The signal from mixing point 115 passes through amplifier 117 and is then shaped by a lag device having a transfer function of $$\frac{1}{\tau_7 S+1}$$

where $\tau_7$ is the time constant of the shaping device, and S is the familiar La Place operator. This signal from shaper 119 combines with the signal from shaper 108 at mixing point 109 to provide the desired damping in the system response and ease of control.

Transducer assembly 38 has its body and rotor so positioned that when tubular member 46 has its axis coincide with axis A—A, there is no signal output. When the arm assembly 40 is moved laterally to the right from its "null" position, by the action of tubular member 46, an output signal is generated which will make the helicopter move laterally to the right and when the arm assembly 40 is moved laterally to the left from its "null" position, an output signal is generated which will make the helicopter move laterally to the left (in FIG. 2 lateral movement to the right of arm assembly 40 is to the right of the viewer and lateral movement to the left of arm assembly 40 is to the left of the viewer).

Any output signal from transducer assembly 38 passes through electrical conductor means 116 to coupler 80. Conductor means 116 is connected to a mixing point 118. Mixing point 118 is in turn connected to an amplifier 120 by another mixing point 122. Amplifier 120 has its output connected to the shaping device 124. Shaping device 124 is connected to another mixing point 126 and the output of this mixing point 126 is connected by electrical conductor means 128 to the roll channel of the automatic stabilization equipment. The shaping device 124 has a transfer function of $$\frac{(\tau_3 S+1)}{(\tau_4 S+1)}$$

where the time constant $\tau_4$ is less than the time constant $\tau_3$, and S is the familiar LaPlace operator. This is provided for system stability and ease of operation.

The signal from transducer assembly 38 is indicative of the line angle in a lateral direction relative to a reference line extending through axis A—A. Changes in line angle to said reference line are caused by changes in fuselage attitude and relative translation from the position of the ground operator in this direction. Changes of the helicopter attitude alone caused by an outside force produce an unwanted signal into mixing point 122. To cancel this unwanted signal, the output from the roll vertical gyro is connected to mixing point 118 which is located between assembly 38 and mixing point 122. This output signal from the roll vertical gyro is an indication of the fuselage attitude relative to a vertical reference line. The signal passing from mixing point 118 to mixing point 122 is an indication of the line angle in a lateral direction relative to a vertical reference line. Changes in relative translation of the helicopter from the position of the ground operator in a lateral direction are command movements and produce a movement of the input member of transducer assembly 40 which will send an error signal to the mixing point 122. Any such signal from mixing point 118, if passed through a mixing point 122, amplifier 120, shaping device 124 and mixing point 126, will cause lateral movement of the helicopter to either the left or the right.

A roll angle bias device has its output connected to the mixing point 122 by electrical conductor means 132. This roll angle bias device puts out a constant signal which combines with any signal from mixing point 118. This roll angle bias device 130 provides a signal which the transducer 40 has to cancel to have a zero output signal from mixing point 122. If this bias device 130 is set at a zero output, transducer assembly 40 is positioned in its regular "null" position which provides no signal output and therefore there is no corresponding movement of the helicopter. However, if the roll angle bias device is set to produce an output signal, this signal will pass through mixing point 122 to the roll channel of the automatic stabilization equipment until it is cancelled by a movement of transducer assembly 40. When transducer assembly 40 has cancelled this output signal of roll angle bias device 130, its new "null" position will be at angle to the "null" position it had with a zero output from the roll angle bias device 130. As the output of the roll angle bias device 130 is varied, this will in turn vary the angle in a lateral direction at which it will be necessary to position tubular member 46 to obtain no signal output from mixing point 122.

Coupler 80 includes an accelerometer 134 which generates a signal which is indicative of the horizontal acceleration in a lateral direction of the helicopter plus its attitude relative to a vertical reference line. The output of accelerometer 134 is connected to a mixing point 136. The output signal from the roll vertical gyro is connected to mixing point 136 to feed in a signal which is an indication of the fuselage attitude relative to a vertical reference line. These signals are electrically combined in mixing point, or network, 136 so that the output of mixing point 136 is proportional only to horizontal acceleration in a lateral direction. Mixing point 136 is connected to an amplifier 138 which is in turn connected to a shaper 140. The output of shaper 140 is connected to mixing point 126. The signal from mixing point 136 passes through amplifier 138 and is then shaped by a lag device having a transfer function of $$\frac{1}{\tau_8 S + 1}$$

where $\tau_8$ is the time constant of the shaping device, and S is the familiar LaPlace operator. This signal from shaper 140 combines with the signal from shaper 124 at mixing point 126 to provide the desired damping in the system response and ease of control.

FIG. 4 shows the altitude channel of an automatic stabilization equipment system including an altitude error sensor 200. Altitude error sensor 200 has its output connected to a mixing point 202 by electrical conductor means 204. Mixing point 202 has its output connected through an amplifier 206 to a subservomotor 208. Any signal from the altitude error sensor which reaches the subservomotor operates it to turn the jackscrew 210. This movement of the jackscrew 210 operates servo valve 212 to direct fluid to one side or the other of the piston in the primary servomotor 214 depending on the signal put out by the altitude sensor 200. The primary servomotor 214 is connected to flight controls which then change in accordance with the signal.

Jackscrew 210 also drives a follow-up transducer 216 which has its output connected to the mixing point 202. Follow-up transducer 216 applies a follow-up signal which opposes the signal from the altitude error sensor 200 which is supplied to the subservomotor 208. Subservomotor 208 will cease to rotate when it has instituted a follow-up signal which exactly cancels the signal from the altitude error sensor. A rate generator 218 is also driven by jackscrew 210 and has its output connected to amplifier 206. Rate generator 218 has a damping effect on the movements of the jackscrew for the purpose of preventing overtravel of the subservomotor. The major components of this altitude channel are shown and described in U.S. Application Serial No. 741,531, filed June 12, 1958, now U.S. Patent No. 3,037,722.

For manual operation of the flight controls, collective pitch stick 220 is moved, such movement being transmitted to the servo valve 212 which operates the primary servomotor 214, as indicated hereinbefore, and which in turn moves the flight controls. A mechanical feedback 222 is connected to the servo valve to reposition it so that the primary servomotor does not continue to move. A mechanical "slop" eliminator 224 is provided which permits the pilot to have a direct mechanical connection from the collective pitch stick 220 to the flight controls in the event his hydraulic system fails or there is some other malfunction of the servomechanisms.

Conductor means 89, which is connected to the output of shaping device 87 in coupler 80, is connected at its other end to a terminal 226. A double-throw switch 228 is associated with conductor means 204 and terminal 226 so that in one position the signal from the altitude error sensor passes to mixing point 202 and in its other position the signal from shaper 87 passes to mixing point 202. Switch 228 is manually operable by the pilot.

FIG. 5 shows the pitch control channel of an automatic stabilization equipment system and comprises a pitch vertical gyro 250, a rate gyro 252, and a follow-up transducer 254. The two gyros contribute to a signal voltage leaving mixing point 256 which drives subservomotor 258 through amplifier 260. This motor drives a rate generator 262 and the follow-up transducer 254 through a jackscrew 266 until the latter contributes a voltage to mixing point 264 which exactly cancels the signal voltage. Mixing point 264 is connected to the inlet of amplifier 260. The subservomotor 258 through jackscrew 266 positions the hydraulic servo, or pilot valve 268. The pilot valve controls the primary servomotor 270 which is connected to the cyclic pitch changing mechanism of the rotor head to effect pitch control of the helicopter. Also shown is the arrangement of a nuller potentiometer, or synchro, 272 controlled by clutch 274 conveniently connected to the pilot stick for operation, and a canceler potentiometer or synchro 276. Canceler potentiometer 276 and nuller potentiometer 272 both have their outputs connected to a mixing point 278 which is in turn connected to a mixing point 280. Mixing point 280 is located between mixing points 256 and 264. This channel is substantially shown and described in U.S. Application Serial No. 741,531, filed June 12, 1958, now U. S. Patent No. 3,037,722.

Electrical conductor means 110, which is connected to the output of mixing point 109 in coupler 80, is connected at its other end to mixing point 278 to which the canceler potentiometer 276 and the nuller potentiometer 272 have their outputs connected. A switch 228a is located in conductor means 110 and can be moved between an open and closed position. This switch is operable by the pilot.

For manual operation of the flight controls of FIG. 5, cyclic pitch stick 282 is moved in a longitudinal direction, such movement being transmitted to the servo valve 268 which operates the primary servomotor 270, as indicated hereinbefore, and which in turn moves the longitudinal flight controls. A mechanical feedback is connected to the servo valve to reposition it so that the primary servomotor does not continue to move. A mechanical "slop" eliminator is provided which permits the pilot to have a direct mechanical connection from the cyclic pitch stick 282 to the longitudinal flight controls in the event it is necessary. An electrical conductor means connects the output of the pitch vertical gyro 250 to mixing point 102 and mixing point 115 in coupler 80.

FIG. 6 shows the roll control channel of an automatic stabilization equipment system and comprises a roll vertical gyro 300, a rate gyro 302 and a follow-up transducer 304. These two gyros contribute to a signal voltage leaving mixing point 306 which drives subservomotor 308 through amplifier 310. This motor drives a rate generator 312 and the follow-up transducer 304 through a jackscrew 314 until the latter contributes a voltage to a mixing point 316 which exactly cancels the signal voltage. Mixing point 316 has its outlet connected to the inlet of amplifier 310. The subservomotor 308 through jackscrew 314 positions the hydraulic servo or pilot valve 318. The pilot valve controls the primary servomotor 320 which is connected to the cyclic pitch changing mechanism of the rotor head to effect roll control of the helicopter. Also shown in the arrangement of a canceler potentiometer or synchro 322 connected to the pilot stick for operation. Canceler potentiometer 322 has its output connected to a mixing point 324 which is in turn connected to a mixing point 326. Mixing point 326 is located between mixing points 306 and 316. This channel is substantially shown and described in U.S. Application Serial No. 741,531, filed June 12, 1958, now U.S. Patent No. 3,037,722.

Electrical conductor means 128, which is connected to the output of mixing point 126 in coupler 80, is connected at its other end to mixing point 324 to which the canceler potentiometer 322 has its output connected. A switch 228b is located in conductor means 128 and can be moved between an open and closed position. This switch is operable by the pilot.

For manual operation of these flight controls of FIG. 6, cyclic pitch stick 282 is moved in a lateral direction, such movement being transmitted to the servo valve 318 which operates the primary servomotor 320 as indicated hereinbefore and which in turn moves the lateral flight controls. A mechanical feedback is connected to the servo valve to reposition it so that the primary servomotor does not continue to move. A mechanical "slop" eliminator is provided which permits the pilot to have a direct mechanical connection from the cyclic pitch stick 282 to the lateral flght controls in the event it is necessary. An electrical conductor means connects the output of the roll vertical gyro 300 to mixing point 118 and mixing point 136 in coupler 80.

The boxes 350 merely represent electrical attach-detach means for easy installation of the system. Further, components of the automatic stabilization equipment system, while shown separately in FIGS. 4, 5 and 6, may be combined as one where possible.

Another switch is provided so that a light attached to the sensor unit 2 and visible to a ground operator goes on when the pilot has placed the system in operation for ground control. This lets the ground operator know he has control. The switches 228, 228a and 228b are shown in position for pilot control. These switches may be arranged for separate or simultaneous operation along with the light switch.

It is to be understood that the invention is not limited to the specific description above or to the specific figures, but may be used in other ways without departure from its spirit as defined by the following claims.

I claim:

1. In combination, a helicopter having blades mounted for pitch changing movement, first means for controlling the collective pitch of said blades, second means for controlling the cyclic pitch of said blades, first transducer means being connected to said second means for actuating them, second transducer means being connected to said first means for actuating them, a first tubular member on said helicopter mounted for angular movement, said first transducer means being connected to said first tubular member and responsive to angular movements thereof, a second rod member mounted for small axial movement in said first tubular member, said second transducer means being connected to said second rod member and responsive to axial movements thereof, said second rod member being moveable by an operator in a position outside of said helicopter, axial movements of said second rod member being conveyed directly to said second transducer means and angular movements of said second rod member being indirectly conveyed to said first transducer means through said first tubular member.

2. In combination, a helicopter having blades mounted for pitch changing movement, first means for controlling the collective pitch of said blades, second means for controlling the cyclic pitch of said blades, first transducer means being connected to said second means for actuating them, second transducer means being connected to said first means for actuating them, a first tubular member on said helicopter, a universal joint mounting said first tubular member to said helicopter, said first transducer means being connected to said first tubular member and responsive to angular movements thereof, a second rod member mounted for small axial movement within said first member, said second transducer means being connected to said second rod member and responsive to axial movements thereof, said second rod member being moveable by an operator in a position outside of said helicopter, angular movements of said second rod member being conveyed to said first tubular member.

3. A transducer assembly comprising a housing, said housing having an opening in one side, a first member extending from said housing through said opening, a universal joint mounting said first member to said housing, a second member mounted for small axial movement with respect to said first member, line means having a fixed length, one end of said line means being fixed to one end of said second member, said line means extending freely from said second member to control the movement thereof, first transducer means in said housing being responsive to angular movements of said first member, and second transducer means being responsive to axial movement of said second member.

4. A transducer assembly comprising a housing, said housing having an opening in one side, a tubular member extending from said housing through said opening, a universal joint mounting said tubular member to said housing, a rod mounted in said tubular member for small axial movement therein, line means having a fixed length, one end of said line means being fixed to one end of said rod, said line means extending freely from said rod to control the movement thereof, first transducer means in said housing being responsive to angular movements of said tubular member, and second transducer means being responsive to axial movement of said rod.

5. A transducer assembly comprising a housing, said housing having an opening in the bottom, a tubular member extending downwardly from said housing through said opening, a universal joint mounting said tubular member to said housing, a rod mounted in said tubular member between stops for a limited small axial movement therein, spring means biasing said rod against one of its stops, line means having a fixed length, one end of said line means being fixed to one end of said rod, said line means extending freely from said rod to control the movement thereof, first transducer means in said housing being responsive to angular movements of said tubular member, and second transducer means being responsive to axial movement of said rod.

6. A transducer assembly comprising a housing, said housing having an opening in one side, a universal joint mounted in said housing, a cage mounted to said joint for angular movement, a tubular member extending from said cage through said opening, a rod mounted in said tubular member for a limited small axial movement therein, line means having a fixed length, one end of said line means being fixed to one end of said rod, said line means extending freely from said rod to control the movement thereof, first transducer means mounted in said housing being responsive to angular movements of said tubular member, and second transducer means mounted in said cage being responsive to axial movement of said rod.

7. A coupling device for coupling signals from a transducer assembly to automatic stabilization equipment of a helicopter including a channel having an amplifier and shaper, said channel having a first mixing network in front of said amplifier, said first mixing network having a connection for receiving a corrective signal to offset an unwanted error signal passing therethrough to said amplifier and shaper, said channel having a second mixing network after said shaper, an accelaromter which generates a signal indicative of horizontal acceleration in a lateral direction plus the lateral attitude of the helicopter to a vertical line, a third mixing network receiving the signal from said accelerometer, said third mixing network also receiving a corrective signal to offset the unwanted signal from the accelerometer indicating the lateral attitude of the helicopter to a vertical line, said second mixing network having a connection for receiving a stabilizing signal from said third network which has an indication of lateral helicopter acceleration.

8. A coupling device for coupling signals from a transducer assembly to automatic stabilization equipment of a helicopter including a channel having an amplifier and shaper, said channel having a first mixing network in front of said amplifier, said channel having a second mixing network in front of said first mixing network, said second mixing network having a connection for receiving a corrective signal to offset an unwanted error signal passing therethrough to said amplifier and shaper, said first mixing network having a connection for receiving a biasing signal to control the signal to the amplifier, said channel having a third mixing network after said shaper, an accelerometer which generates a signal indicative of horizontal acceleration in a lateral direction plus the lateral attitude of the helicopter to a vertical line, a fourth mixing network receiving the signal from said accelerometer, said fourth mixing network also receiving a corrective signal to offset the unwanted signal from the accelerometer indicating the lateral attitude of the helicopter to a vertical line, said third mixing network having a connection for receiving a stabilizing signal from said fourth network which has an indication of lateral helicopter acceleration.

9. A method of operating a helicopter having an automatic control system with a manual control which extends from the helicopter to an operator below said helicopter which comprises: moving said manual control at an angular position relative to said helicopter to direct the helicopter in the direction the control is moved, moving said manual control in a downwardly direction to produce a downward movement of said helicopter, and moving said manual control upwardly to produce an upward movement of said helicopter.

10. A method of operating a helicopter having an automatic control system with a manual control which extends externally of the helicopter to an operator below said helicopter which comprises: moving the manual control in a direction to produce directional movement of said helicopter in that direction, and moving the manual control in a vertical direction to produce movement of said helicopter in a vertical direction.

11. A method of operating a hovering type aircraft having a control operative externally of said aircraft, said conrtol having a line extending to an operator below the aircraft, including the steps of, moving said line angularly to move the aircraft in a horizontal direction, and moving said line vertically to move the aircraft in altitude.

12. A method of operating a hovering type aircraft having an automatic control system with a control operative externally of said aircraft and attached thereto, including moving said control to produce a signal which is introduced to said automatic control system which will move said aircraft in a horizontal direction, and moving said control vertically to produce a signal which is introduced to said automatic control system which will move said aircraft in a vertical direction.

13. In combination, a helicopter having blades mounted for pitch changing movement, first means for controlling the collective pitch of said blades, second means for controlling the cyclic pitch of said blades, first transducer means being connected to said second means for actuating them, second transducer means being connected to said first means for actuating them, a first tubular member on said helicopter, a universal joint mounting said first tubular member to said helicopter, said first transducer means being connected to said first tubular member and responsive to angular movements thereof, a second rod member mounted for small axial movement within said first member, said second transducer means being connected to the upper end of said second rod member and responsive to axial movements thereof, a length of line, said line being connected to the lower end of said second rod member, said second rod member being movable by an operator in a position outside of said helicopter by movement of said line, angular movements of said second rod member being conveyed to said first tubular member.

14. In combination, a helicopter having blades mounted for pitch changing movement, first means for controlling the collective pitch of said blades, second means for controlling the cyclic pitch of said blades, first transducer means being connected to said second means for actuating them, second transducer means being connected to said first means for actuating them, a first tubular member on said helicopter mounted for angular movement, said first transducer means being connected to said first tubular member and responsive to angular movements thereof, a second rod member mounted for small axial movement in said first tubular member, said second transducer means being connected to said second rod member and responsive to axial movements thereof, said second rod member being movable by an operator in a position outside of said helicopter, axial movements of said second rod member being conveyed directly to said second transducer means and angular movements of said second rod member being indirectly conveyed to said first transducer means through said first tubular member, and means for regulating the angle said second rod member makes with said helicopter to have said helicopter hover.

15. A signal coupling device for a craft having an automatic stabilization device comprising:
 means for receiving a first input signal indicative of variations from a desired altitude,
 means including signal amplifying and shaping devices for modifying said first input signal,
 means for applying said modified first signal to the automatic stabilization device,
 means for receiving a second input signal indicative of relative motion of the craft in one direction about a control point remotely located from the craft,
 means for receiving a third input signal indicative of the position of the craft about a first axis,
 means responsive to said second and third input signals to provide a first error signal indicative of displacement of the craft in one direction from the desired position relative to said control point,
 means for receiving a fourth input signal indicative of relative motion of the craft in a second direction about the control point remotely located from the craft,
 means for receiving a fifth input signal indicative of the position of the craft about a second axis perpendicular to said first axis, means responsive to said fourth and fifth input signals to provide a second error signal indicative of displacement of the craft in the second direction from the desired position relative to said control point, means for applying said first and second error signals to the automatic stabilization device.

References Cited in the file of this patent

UNITED STATES PATENTS

| | | |
|---|---|---|
| 2,139,558 | Moseley | Dec. 6, 1938 |
| 2,471,821 | Kutzler | May 31, 1949 |
| 2,582,305 | Young | Jan. 15, 1952 |
| 2,650,046 | Vanderlip | Aug. 25, 1953 |
| 2,873,075 | Mooers | Feb. 10, 1959 |
| 2,895,086 | Pettit | July 14, 1959 |
| 2,948,489 | Miller | Aug. 9, 1960 |

OTHER REFERENCES

Thaler: "Servomechanism Theory," McGraw-Hill, 1955, pages 46, 56, 132.

N.A.C.A. Tech. Note 3947, January 1957, page 12, FIG. 2.